United States Patent
Morooka

[11] Patent Number: 5,353,159
[45] Date of Patent: Oct. 4, 1994

[54] THREE-UNIT COMPACT ZOOM LENS SYSTEM

[75] Inventor: Masaru Morooka, Tokyo, Japan

[73] Assignee: Olympus Optical Co., Ltd., Tokyo, Japan

[21] Appl. No.: 812,101

[22] Filed: Dec. 23, 1991

[30] Foreign Application Priority Data

Dec. 26, 1990 [JP] Japan ................... 2-406528

[51] Int. Cl.$^5$ ............................... G02B 15/14
[52] U.S. Cl. ..................... 359/689; 359/708
[58] Field of Search ................. 359/689, 708

[56] References Cited

U.S. PATENT DOCUMENTS

| | | | |
|---|---|---|---|
| 4,726,668 | 2/1988 | Nakayama et al. | 359/689 |
| 4,773,744 | 9/1988 | Yamanashi | 359/708 X |
| 4,983,027 | 1/1991 | Kojima | 359/689 |
| 5,069,536 | 12/1991 | Ogata | 359/689 |
| 5,166,828 | 11/1992 | Ogata | 359/689 |

FOREIGN PATENT DOCUMENTS

| | | |
|---|---|---|
| 62-78522 | 4/1987 | Japan . |
| 250117 | 2/1990 | Japan . |
| 293713 | 4/1990 | Japan . |

Primary Examiner—Scott J. Sugarman
Attorney, Agent, or Firm—Cushman, Darby & Cushman

[57] ABSTRACT

This invention relates to a three-unit compact zoom lens system having a zoom ratio of about 2, whose telephoto ratio at the wide angle end is as short as 1.3 or lower and in which the lens diameter of the first lens unit is reduced. This zoom lens system comprises a first positive lens unit G1, a second positive lens unit G2 and a third negative lens unit G3, and in zooming from the wide angle to telephoto end, the first and third lens units are movable toward the object side and the second lens unit is movable toward the object side at a speed relatively lower than that at which the first and third lens units are moved. Furthermore, the present zoom lens system satisfies the following condition:

$$0.5 < |f_3/f_W| < 0.9, \quad (1)$$

$$1.3 < \beta_{3W} < 2.0, \quad (2)$$

$$1.7 < f_1/f_W < 5.0, \quad (3)$$

and $$0.5 < f_2/f_W < 1.3. \quad (4)$$

Here $f_W$ is the focal length of the total system at the wide angle end $f_1$, $f_2$ and $f_3$ are the focal lengths of the first, second and third lens units, respectively, and $\beta_{3W}$ is the image-formation magnification of the third lens unit.

11 Claims, 10 Drawing Sheets

W

T

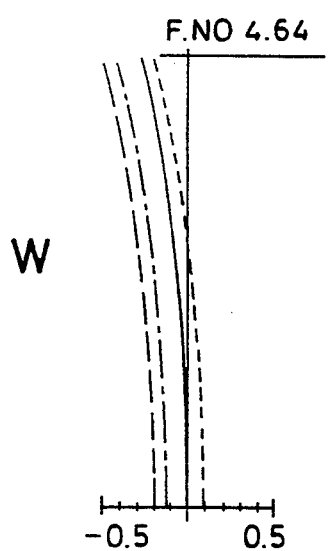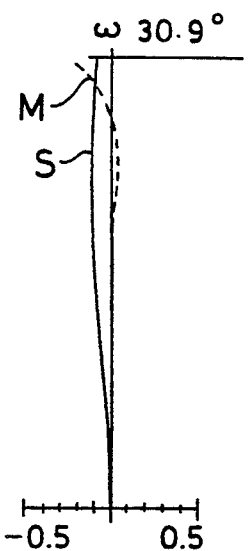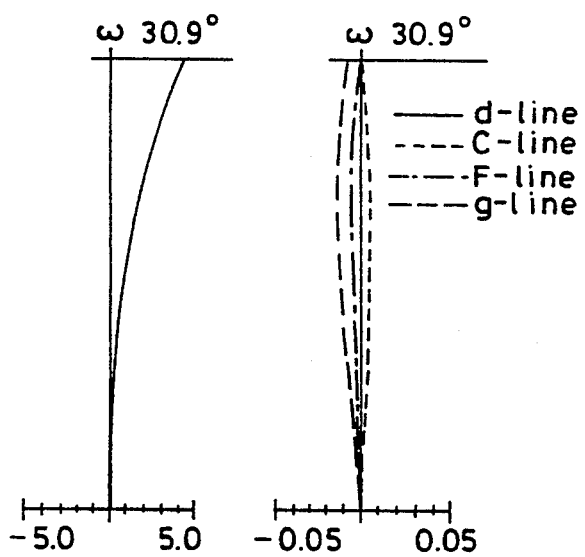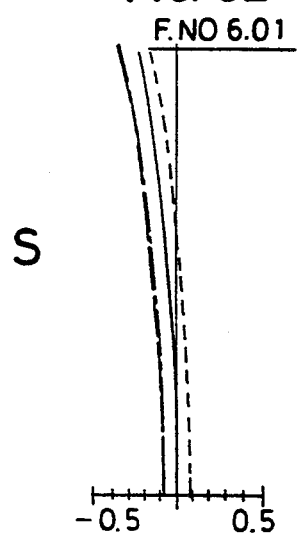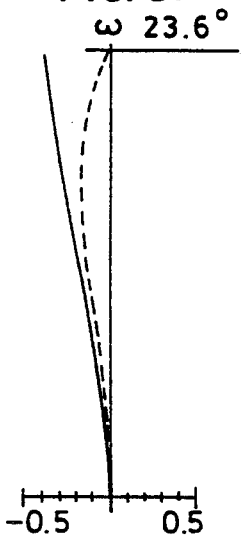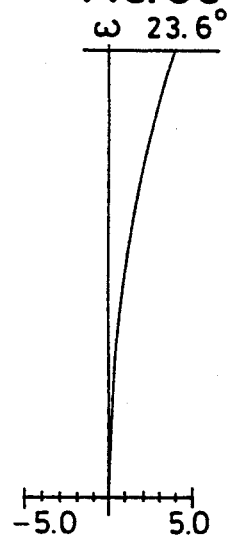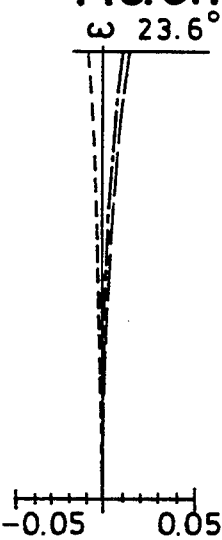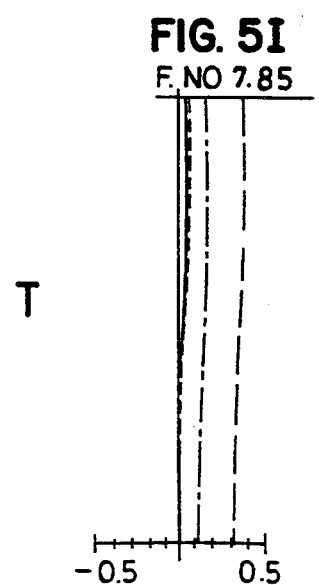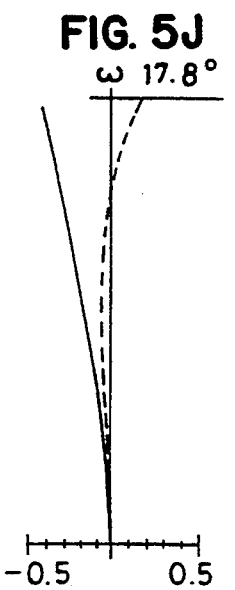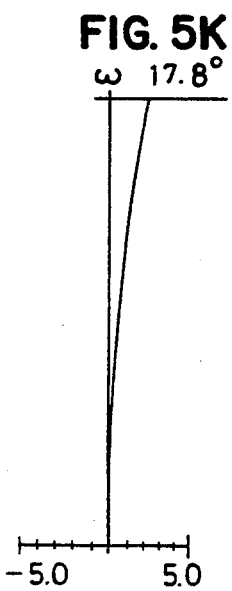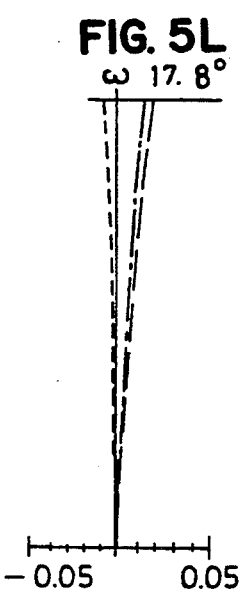

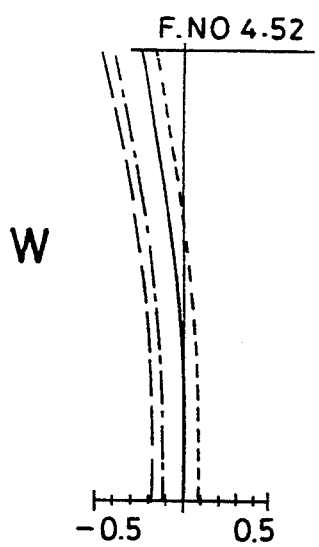 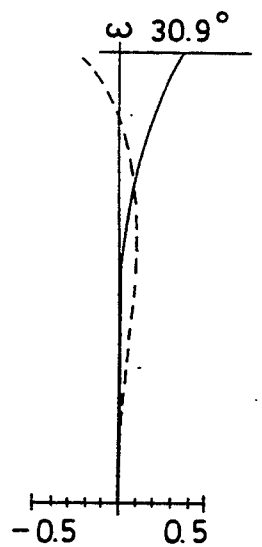 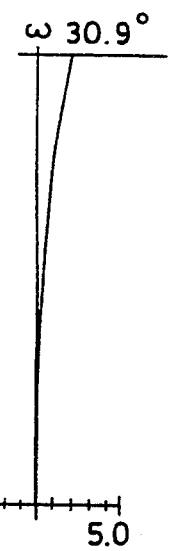 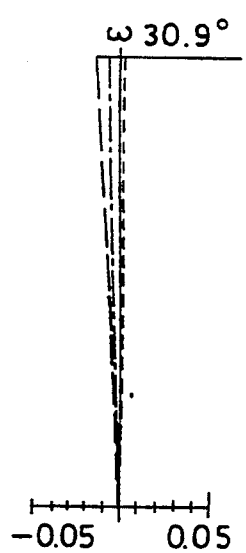
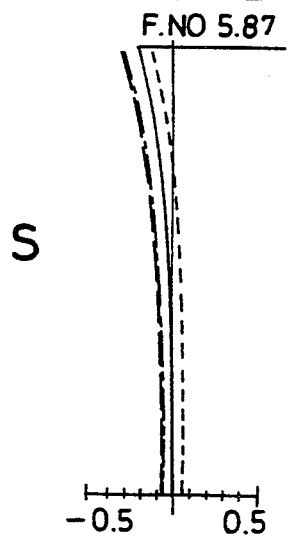 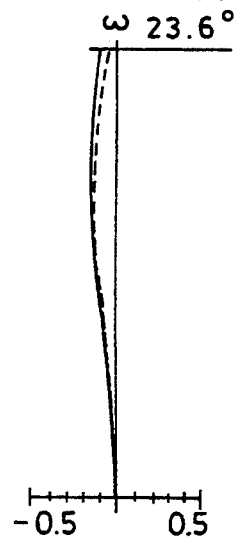 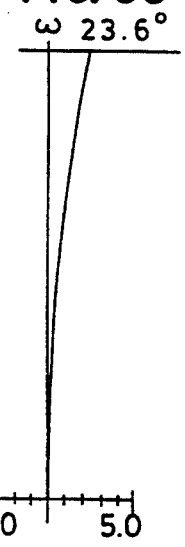 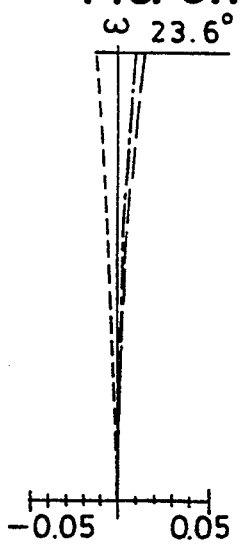
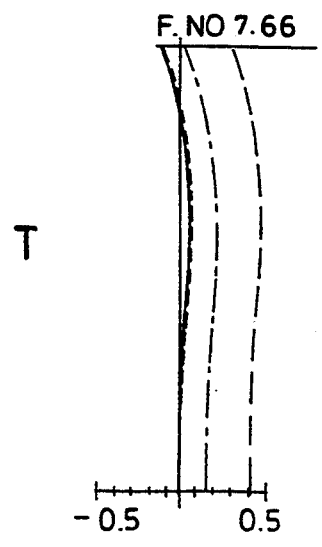 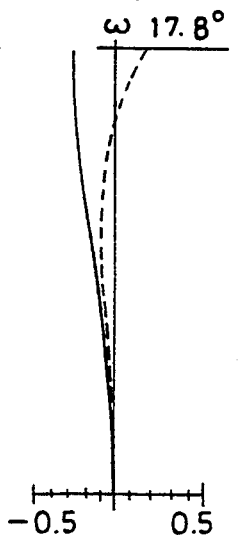 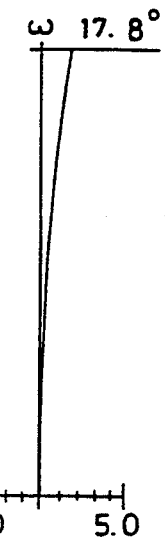 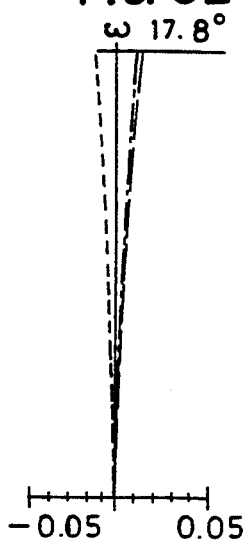

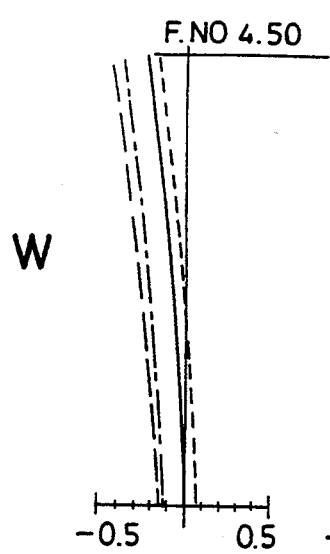
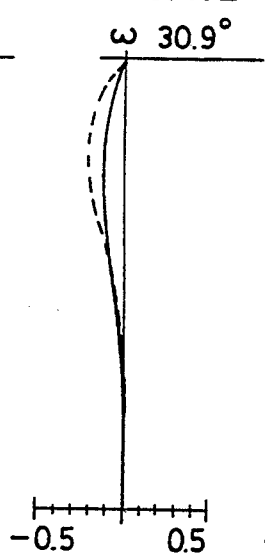
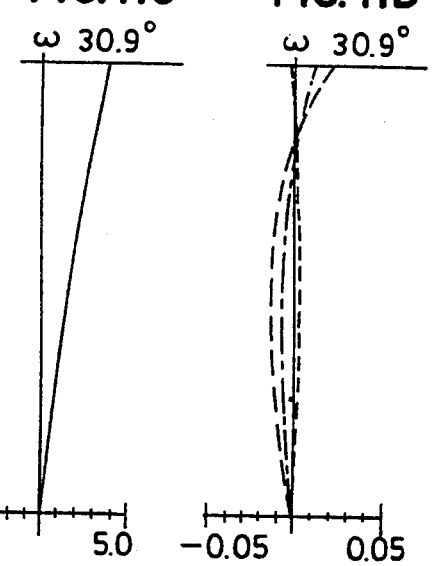
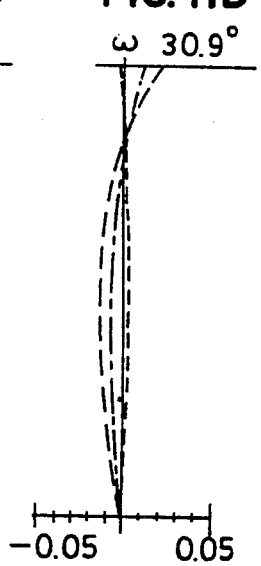
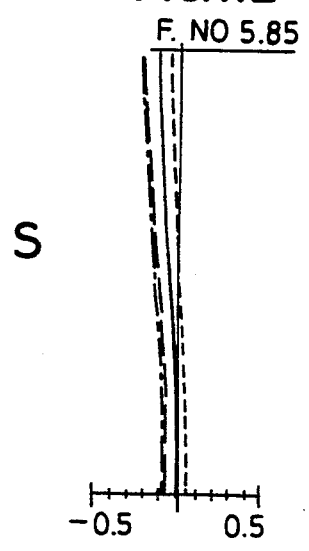
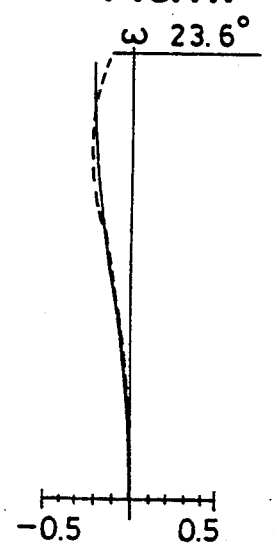
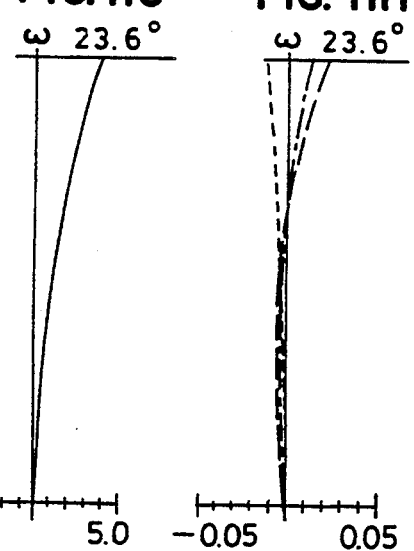
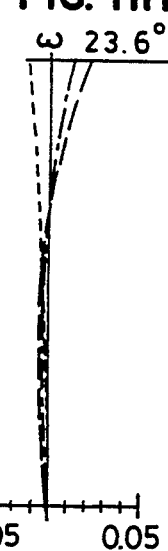
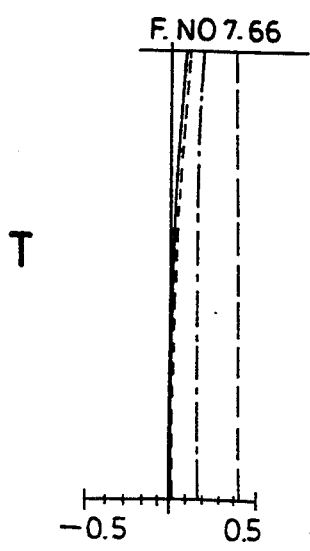
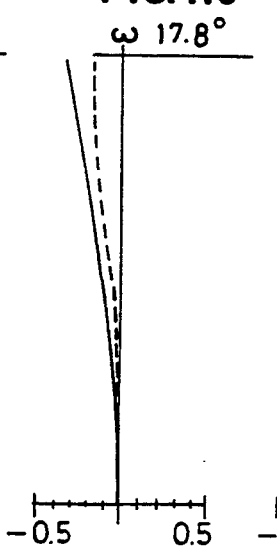
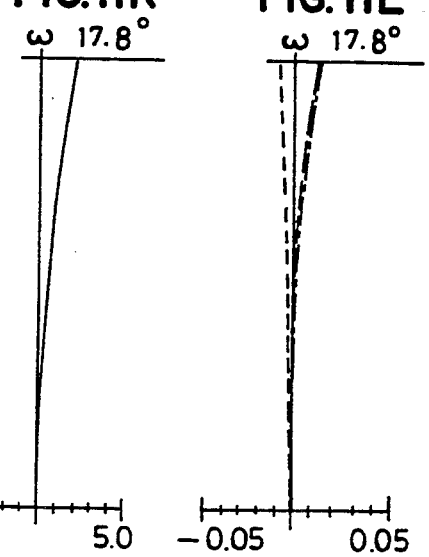
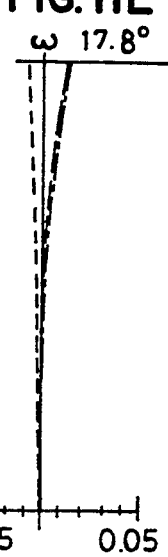

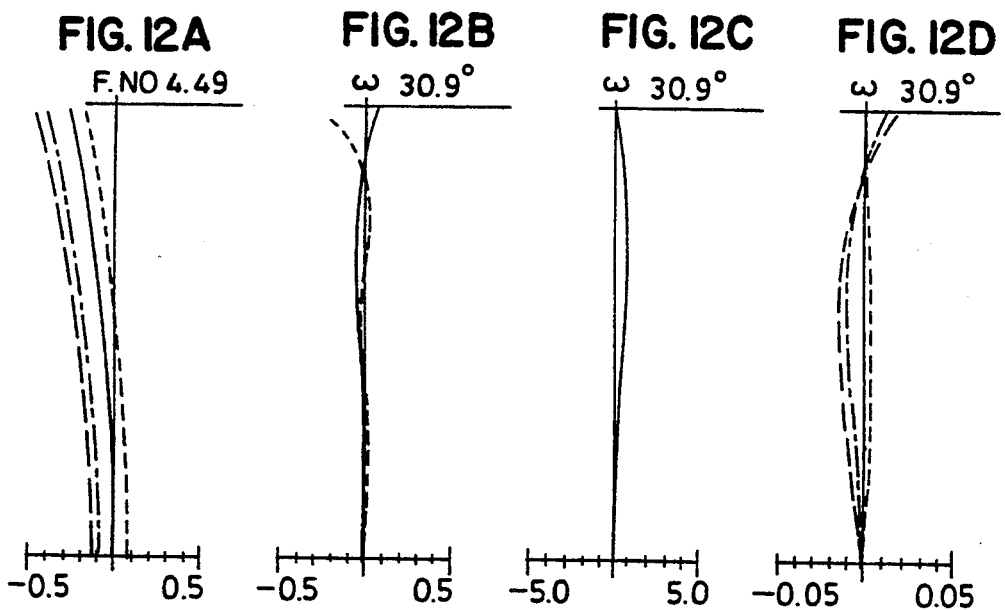

THREE-UNIT COMPACT ZOOM LENS SYSTEM

BACKGROUND OF THE INVENTION

The present invention relates to a compact zoom lens system having a zoom ratio of about 2 and a short total length so that it can be suitably used for lens shutter cameras etc. and, more particularly, to a zoom lens system comprising three positive, positive and negative units.

In recent years, zoom lenses more reduced in size and weight have been desired to meet an increased demand for making lens shutter cameras have a zooming function. For lens systems used for such lens shutter cameras, it is not required to make sure of a specific back focus, unlike lens systems mounted on single-lens reflex cameras. However, too snort a back focus would give rise to an increase in the diameter of the image-side lens. On the other hand, too long a back focus would lead to an increase in the lens's overall length with the result that it would be impossible to achieve any zoom lens compact in size.

For instance, the lens system set forth in Japanese Provisional Patent Publication No. 62(1987)-78522 is a zoom lens for lens shutter cameras, which comprises a first unit having a positive refractive power, a second unit having a positive refractive power and a third unit having a negative refractive power. This conventional zoom lens is comparable to a two-unit zoom lens in that it has a telephoto ratio of about 1.3 at the wide angle end, but the lens diameter of the first unit is too large. This zoom lens also has a zoom ratio of some 1.5. Some examples of the zoom lens system, which has a zoom ratio of ca. 2 with equally distributed positive, positive and negative refractive powers and wherein the first unit is made integral with the third unit during zooming, are set forth in Japanese Provisional Patent Publications Nos. 1(1989)-93713 and 2(1990)-50117. These prior art examples have a telephoto ratio of as large as about 1.4 and about 1.5 at the wide angle ends, respectively, and are increased in the overall lengths with increases in the lens diameters of the first units as well.

The zoom lens set forth in the above Japanese Provisional Patent Publication No. 62-78522 is comparable to a two-unit zoom lens in that its telephoto ratio at the wide angle end is about 1.3, but although it is reduced in the overall length, yet the lens diameter of the first unit is so increased that it is disadvantageous for making a camera body on which it is mounted compact in size. The conventional zoom lenses set forth in Japanese Provisional Patent Publications Nos. 1-93713 and 2-50117, which have a zoom ratio of about 2 that is the same as that of the present invention and wherein the first components are movable together with the third components toward the object side, but they have a telephoto ratio as large as about 1.4 and about 1.5, respectively, and are increased in the overall lengths. In addition, they are not said to be compact in size, because the lens diameters of the first units are large.

SUMMARY OF THE INVENTION

Having been accomplished in view of the foregoing, this invention seeks to solve the above problems associated with the prior art and thus provide a three-unit compact type of zoom lens system having a zoom ratio of about 2, in which the telephoto ratio at the wide angle end is reduced to 1.3 or below and the lens diameter of the first unit is so reduced that it can be made compact in size.

According to this invention, the above object is attained by the provision of a three-unit compact zoom lens system which comprises, in order from the object side, a first lens unit having a positive refractive power, a second lens unit having a positive refractive power and a third lens unit having a negative refractive power, as can be seen from FIGS. 1-4, wherein in zooming from the wide angle to telephoto end, said first and third lens units being movable together toward the object side and said second lens being movable toward the object side at a speed relatively lower than that at which said first and third lens units are moved, and which further satisfies the following conditions (1)-(4):

$$0.5 < |f_3/f_W| < 0.9, \quad (1)$$

$$1.3 < \beta_{3W} < 2.0, \quad (2)$$

$$1.7 < f_1/f_W < 5.0, \quad (3)$$

and $$0.5 < f_2/f_W < 1.3. \quad (4)$$

Here:

$f_W$ is the focal length of the total system at the wide angle end, $f_1$, $f_2$ and $f_3$ are the focal lengths of the first, second and third lens units, respectively, and $\beta_{3W}$ is the image-formation magnification of the third lens unit.

Preferably, the zoom lens system according to this invention should meet the following condition:

$$0.1 < E_W/f_W < 0.35. \quad (5)$$

Here $E_W$ is the the distance from the first surface (proximate to the object side) to the entrance pupil of the lens system at the wide angle end.

More preferably, an aperture stop should be located on the entrance side of the second lens unit and adapted to be moved together therewith.

Alternatively, the first and third lens units may be designed to be movable while the space therebetween is kept invariable.

According to the zoom lens system of this invention, the first lens unit may comprise a negative meniscus lens convex on the object side and a positive meniscus lens convex on the object side, the second lens unit may include one negative Lens and two positive lenses, and the third lens unit may include two negative lenses.

The second lens unit may then include an aspherical surface.

Furthermore, the zoom lens system of this invention may satisfy the following condition:

$$(n_{2P}) < 1.65 \quad (6)$$

wherein $(n_{2P})$ is the mean value of the refractive indices of the positive lenses in the second lens unit.

In a preferable embodiment, the zoom lens system of this invention comprises, in order from the object side, a first lens unit including a negative meniscus lens convex on the object side and a positive meniscus lens convex on the object side and having a positive refractive power, a second lens unit including a negative lens and a positive lens, as viewed from the object side, and having a positive refractive power and a third lens unit including a positive lens concave on the object side and a negative lens concave on the object side and having a negative refractive power, said first, second and third lens units being all movable toward the object side with said first and second lens units being spaced away from each other while said second and third lens units being moved toward each other, whereby said zoom lens system can be constructed as a zoom lens system which is increased in the focal length of the total system.

In this case, the negative and positive meniscus lenses of the first lens units may be cemented together and the positive lens of the second lens unit may include a cemented lens. More preferably, the cemented lens of the second lens unit should be a positive lens to be located proximate to the image side.

Referring now to aspherical configuration, the positive lens of the second lens unit located proximate to the image side may have an aspherical surface, and the positive lens of the second lens unit located proximate to the object side may have an aspherical surface as well.

In this case, the zoom lens system may be designed to have a telephoto ratio of 1.3 or less at the wide angle end.

In an alternative embodiment, the zoom lens system according to this invention may comprise a first lens unit comprising two lenses at most, a second lens unit comprising four lenses at most and a third lens unit comprising three lenses at most.

In what follows, the action of this invention will be explained in detail.

According to the zoom lens system of this invention, the first lens unit G1 stands nearest to the second lens unit G1 at the wide angle end, so that they can form a telephoto type of lens system together with the third lens unit G3. Hence, if the composite power of the first and second lens units G1 and G2 and the power of the third lens unit G3 are increased, then it is possible to reduce the total length of the lens system. To this end, the above conditions (1) and (2) must be satisfied.

Above the upper limit of Condition (1) where the third lens unit G3 declines in power, the telephoto Type of action is so decreased that the total length of the lens system would become too long or some difficulty would be involved in reducing it. Falling short of the lower limit may be advantageous for reducing the total length of the lens system; but this would make it difficult to correct aberration variations, esp., curvature of field.

Condition (2) is directed to the image-formation magnification of the third lens unit G3, and this gives a definition to the composite power of the first and second lens units G1 and G2 as well, because if $f_{12W}$ is let denote the composite focal length of the first and second lens units G1 and G2, then $f_W = f_{12W} \cdot \beta_{3W}$. Only a reduction in the total length of the lens system, for instance, would be easily achievable by making the back focus approximate to zero. However, this is undesired for making a camera body compact, because the third lens unit G3 lies in too close proximity to the image surface, inevitably resulting in an increase of the diameters of those lenses. Thus, even though the total length of the lens system is reduced, making the camera body compact cannot be achieved without making sure of a sufficient back focus. Let $f_{BW}$ denote the back focus at the wide angle. Then $f_{BW} = f_3(1 - \beta_{3W})$. Hence, the longer $\beta_{3W}$ with respect to $f_3$ defined by Condition (1), the longer the back focus can be and so the smaller the lens diameter of the third lens unit G3 can be. Magnifications higher than the upper limit of Condition (2) are favorable for the total length and back focus of the lens system, but they would give rise to too large an increase in the composite power of the first and second lens unit G1 and G2, making difficult to correct aberration changes. At magnifications below the lower limit, on the other hand, the target of reducing the size of the lens system is unachievable.

Condition (3) must be met so as to reduce the lens diameter of the first lens unit G1. Above the upper limit of Condition (3) the power of the first lens unit G1 is so decreased that the entrance pupil is very close at the wide angle end. This would be favorable for reducing the lens diameter of the first lens unit G1, but would make it difficult to correct aberration changes, esp., curvature of field and distortion. Also, the entrance pupil is far away at the telephoto end and the total length of the lens system at the telephoto end becomes too large. Below the lower limit the target of reducing the size of the lens system would be unachievable, because there is too large an increase in the power of the first lens unit.

Insofar as Formulae (1) and (2) are concerned, it may be possible to reduce the total length of the lens system at the wide angle end. However, as the amount of movement of the lens units increase in association with zooming, it becomes impossible to reduce the thickness of a camera body. Thus, the amount of movement of the lens units must be reduced for achieving the reduction in the size of the camera body. Provided for this purpose is Condition (4). Above the upper limit the powers of the respective lens units decline, resulting in an increase in the amount of movement thereof. Below the lower limit, by contrast, the powers of the respective lens units are too large to correct aberrations.

In so far as Formula (3) is concerned, it may be possible to reduce the lens diameter of the first lens unit G1. In order to reduce that lens diameter, however, the entrance pupil location must more preferably conform to the ensuing condition (5):

$$0.1 < E_W/f_W < 0.35. \quad (5)$$

Here $E_W$ is the distance from the first surface of the lens to the entrance pupil position at the wide angle end. Above the upper limit of Formula (5) the entrance pupil position is far away, resulting in an increase in the lens diameter of the first lens unit G1. Below the lower limit, on the other hand, the entrance pupil location is very close. This would be favorable for reducing the lens diameter of the first lens unit G1, but would rather result in an increase in the lens diameter of the third lens unit G3 and make it difficult to correct aberrations off-axially.

It is noted that for zooming from the wide angle to telephoto end, an aperture stop is located in front of the first lens unit G2 and moved therewith toward the object side, whereby it is possible to reduce the entrance pupil distance. If the aperture stop is located within the second lens unit G2, then the lenses located before and after it are out of the center, so that when assembled together, the performance of the resulting lens assembly degrades. If the aperture stop is located in the rear of the second lens unit 62, there is then an increase in the entrance pupil distance.

For the purpose of zooming, the first and third lens units G1 and G3 may be moved together toward the object side, whereby the lens frame structure can be simplified, resulting in a decrease in the frame diameter and size.

By meeting the above formulae (1) to (5), it is possible to reduce the diameter of the lenses used. For the purpose of correcting aberrations more satisfactorily, it is desired that the respective lens units have the following lens constructions. The first lens unit G1 comprises a negative meniscus lens convex on the object side and a positive meniscus lens convex on the object side, the second lens unit G2 of at least one negative lens and at least two positive lenses, and the third lens unit G3 of at least two negative lenses. In addition, the second lens unit G2 has at least one aspherical surface, which decreases in positive power or increases in negative power, as it is spaced away from the optical aixs. If required, the negative and positive lens of the second lens unit G1 may be cemented together or divided into parts.

The above lens arrangement should desirously satisfy the following condition (6):

$$(n_2P) < 1.65. \quad (6)$$

Here $(n_2P)$ is the mean value of the refractive indices with respect to d-lines of the positive lenses in the second lens unit G2. Above the upper limit of Formula (6), curvature of field is over-corrected, and is difficult to correct at the wide angle end in particular.

Still other objects and advantages of the invention will in part be obvious and will in part be apparent from the specification.

The invention accordingly comprises the features of the construction, combinations and elements, and arrangement parts which will be exemplified in the construction hereinafter set forth, and the scope of the invention will be indicated in the claims.

BRIEF DESCRIPTION OF THE DRAWINGS

This invention will now be explained specifically but not exclusively with reference to the accompanying drawings, in which:

FIGS. 5A, 5B, 5C, 5D, 5E, 5F, 5G, 5H, 5I, 5J, 5K, 5L–12A, 12B, 12C, 12E, 12E, 12F, 12G, 12H, 12I, 12J, 12K, 12L are aberration curve diagrams of Examples 1–8 at the wide angle (W), standard (S) and telephoto (T) settings.

In these drawings, FIG. 5A represents Spherical aberration, FIG. 5B represents Astigmatism, FIG. 5C represents Distortion, and FIG. 5D represents Chromatic aberration of magnification at the wide setting. FIG. 5E represents Spherical aberration, FIG. 5F represents Astigmatism, FIG. 5G represents Distortion, and FIG. 5H represents Chromatic aberration of magnification at the standard setting. FIG. 5I represents Spherical aberration, FIG. 5J represents Astigmatism, FIG. 5K represents Distortion, and FIG. 5L represents Chromatic aberration of magnification at the telephoto setting.

FIG. 6A represents Spherical aberration, FIG. 6B represents Astigmatism, FIG. 6C represents Distortion, and FIG. 6D represents Chromatic aberration of magnification at the wide setting. FIG. 6E represents spherical aberration, FIG. 6F represents Astigmatism, FIG. 6G represents Distortion, and FIG. 6H represents Chromatic aberration of magnification at the standard setting. FIG. 6I represents Spherical aberration, FIG. 6J represents Astigmatism, FIG. 6K represents Distortion, and FIG. 6L represents Chromatic aberration of magnification at the telephoto setting.

FIG. 10A represents Spherical aberration, FIG. 10B represents Astigmatism, FIG. 10C represents Distortion, and FIG. 10D represents Chromatic aberration of magnification at the wide setting. FIG. 10E represents Spherical aberration, FIG. 10F represents Astigmatism, FIG. 10G represents Distortion, and FIG. 10H represents Chromatic aberration of magnification at the standard setting. FIG. 10I represents Spherical aberration, FIG. 10J represents Astigmatism, FIG. 10K represents Distortion, and FIG. 10L represents Chromatic aberration of magnification at the telephoto setting.

DESCRIPTION OF THE PREFERRED EMBODIMENTS

Figure 1A:
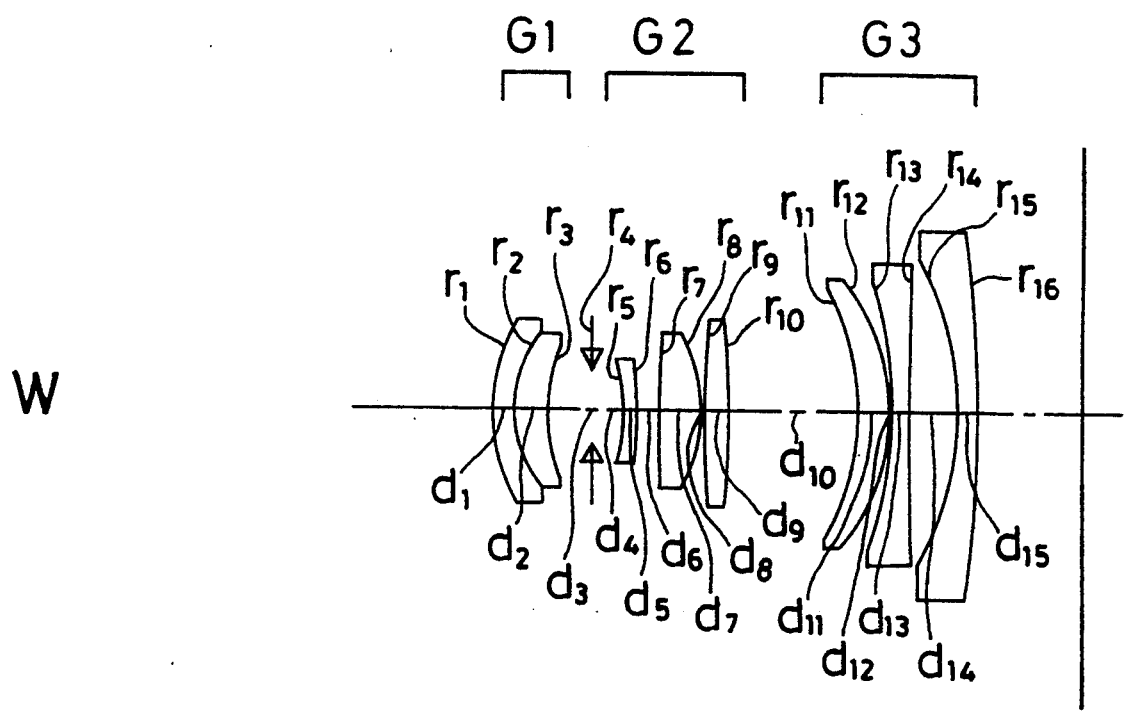
FIGS. 1A and 1B are, respectively, sectional views of the zoom lens systems according to Examples 1 and 2 at the wide angle (W) and telephoto (T) ends, respectively.
Figure 1B:
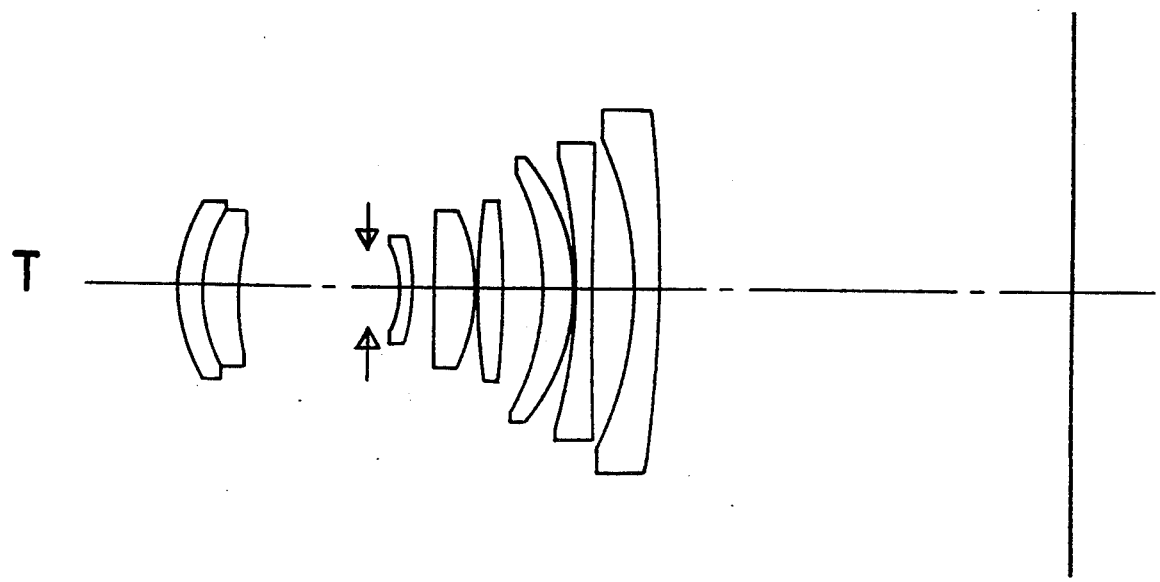
Figure 2:
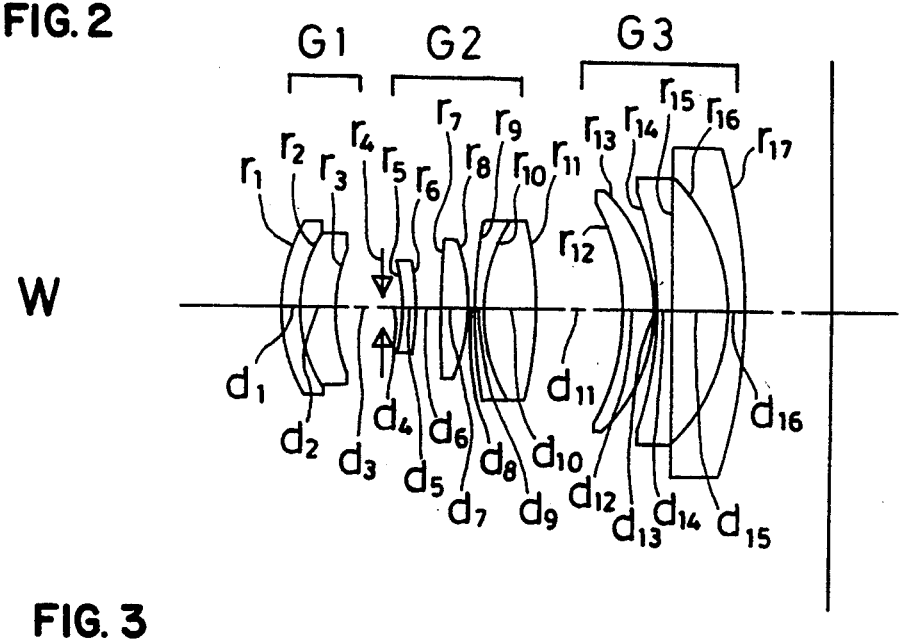
FIGS. 2 is a sectional view of the zoom lens systems according to Examples 3, 5, 6 and 8 at the wide angle ends (W)
Figure 3:
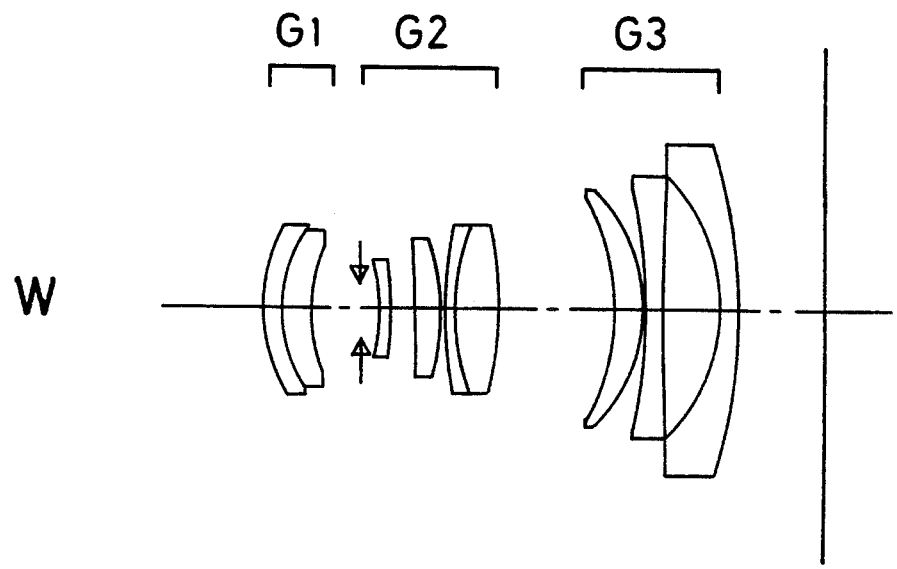
FIG. 3 is a sectional view of the zoom lens system according to Example 4 at the wide angle end (W)
Figure 4:
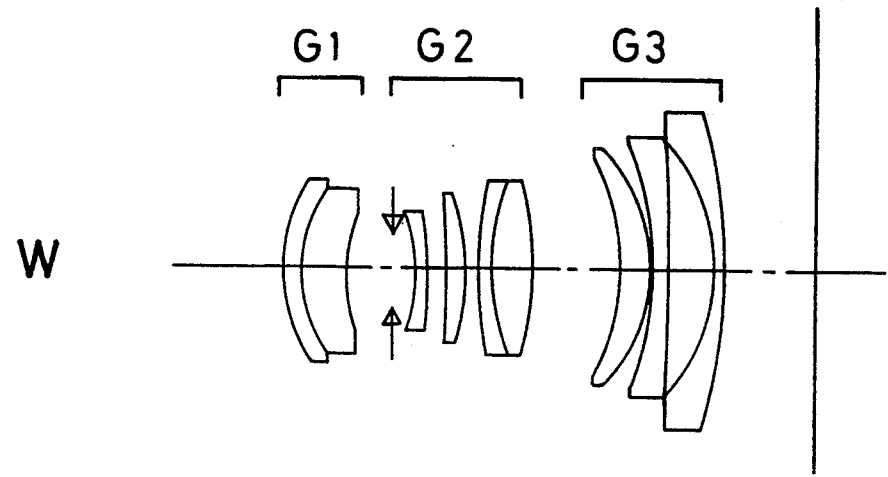
FIG. 4 is a sectional view of the zoom lens system according to Example 7 at the wide angle end (W)
Figure 7A:
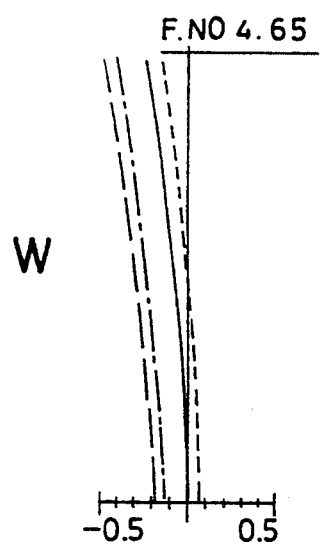
FIG. 7A represents Spherical aberration.
Figure 7B:
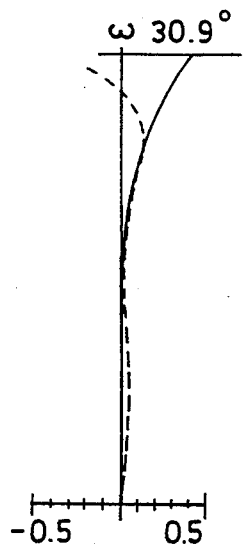
FIG. 7B represents Astigmatism.
Figure 7C:
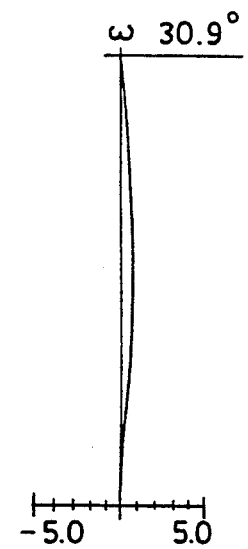
FIG. 7C represents Distortion.
Figure 7D:
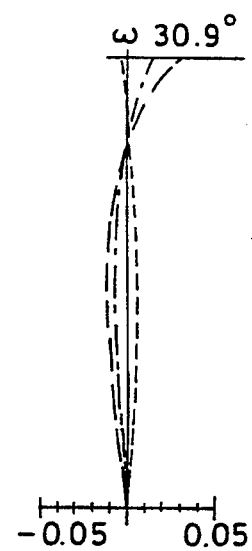
FIG. 7D represents Chromatic aberration of magnification at the wide setting.
Figure 7E:
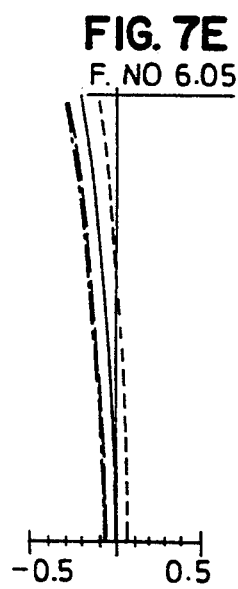
FIG. 7E represents Spherical aberration.
Figure 7F:
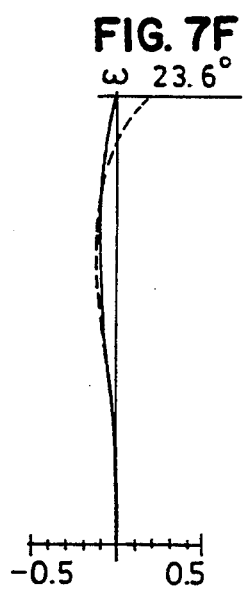
FIG. 7F represents Astigmatism.
Figure 7G:
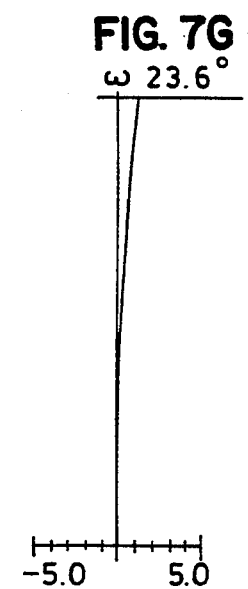
FIG. 7G represents Distortion.
Figure 7H:
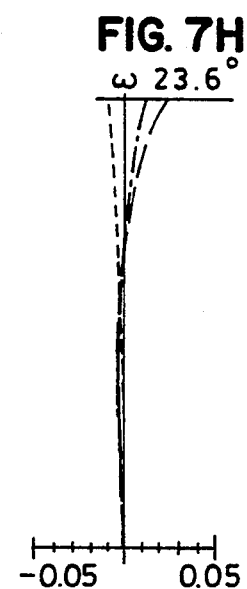
FIG. 7H represents Chromatic aberration of magnification at the standard setting.
Figure 7I:
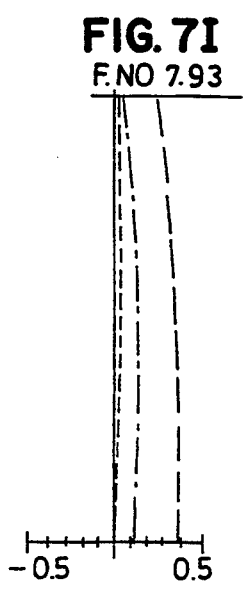
FIG. 7I represents Spherical aberration.
Figure 7J:
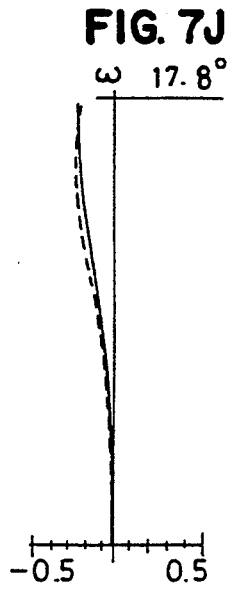
FIG. 7J represents Astigmatism.
Figure 7K:
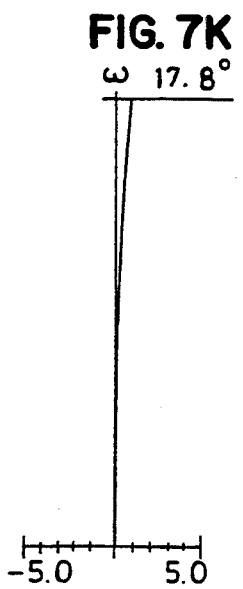
FIG. 7K represents Distortion.
Figure 7L:
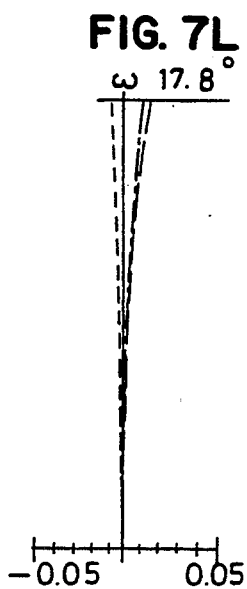
FIG. 7L represents Chromatic aberration of magnification at the telephoto setting.
Figure 8A:
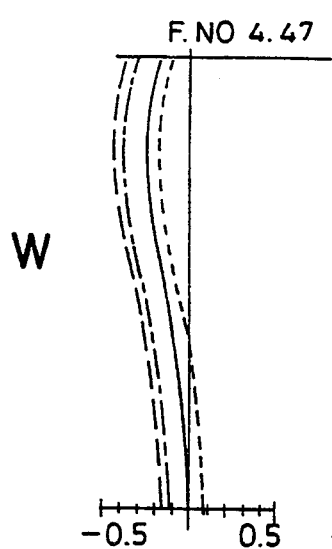
FIG. 8A represents Spherical aberration.
Figure 8B:
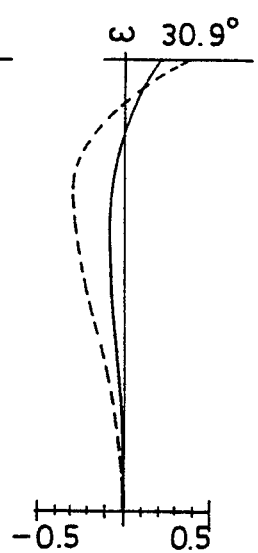
FIG. 8B represents Astigmatism.
Figure 8C:
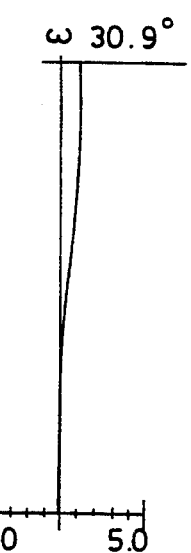
FIG. 8C represents Distortion.
Figure 8D:
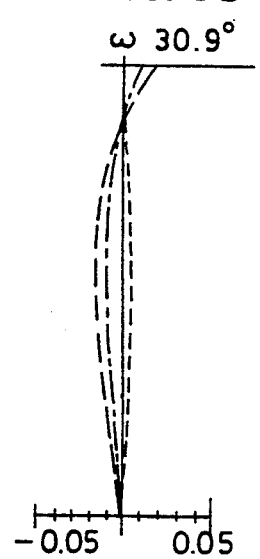
FIG. 8D represents Chromatic aberration of magnification at the wide setting.
Figure 8E:
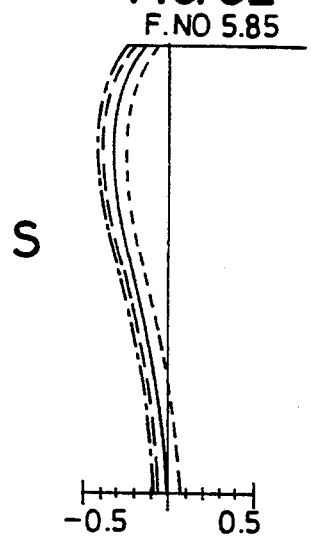
FIG. 8E represents Spherical aberration.
Figure 8F:
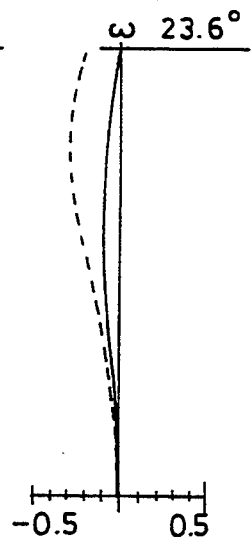
FIG. 8F represents Astigmatism.
Figure 8G:
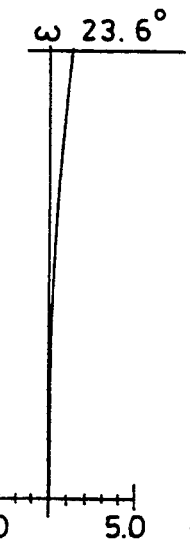
FIG. 8G represents Distortion.
Figure 8H:
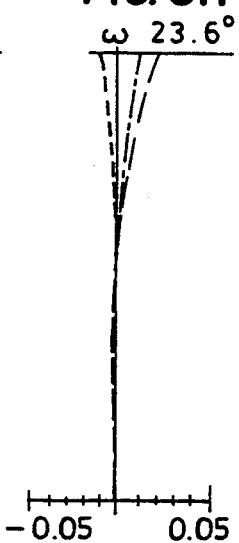
FIG. 8H represents Chromatic aberration of magnification at the standard setting.
Figure 8I:
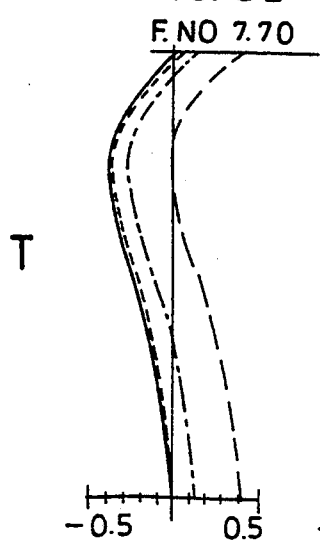
FIG. 8I represents Spherical aberration.
Figure 8J:
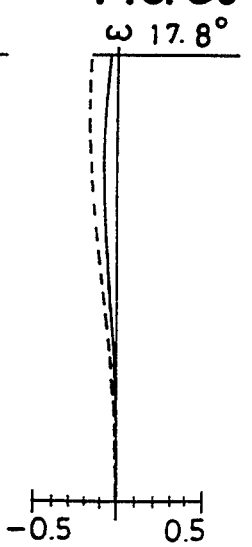
FIG. 8J represents Astigmatism.
Figure 8K:
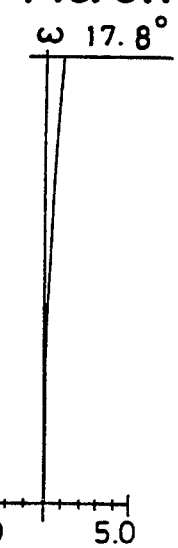
FIG. 8K represents Distortion.
Figure 8L:
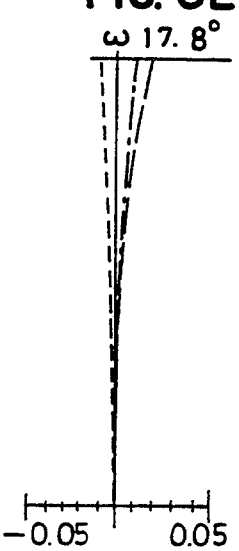
FIG. 8L represents Chromatic aberration of magnification at the telephoto setting.
Figure 9A:
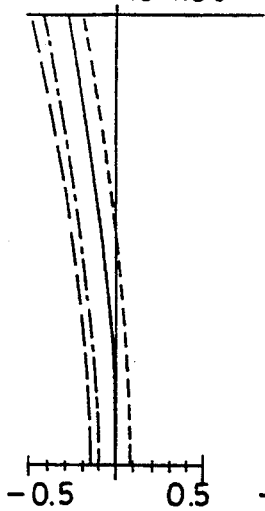
FIG. 9A represents Spherical aberration.
Figure 9B:
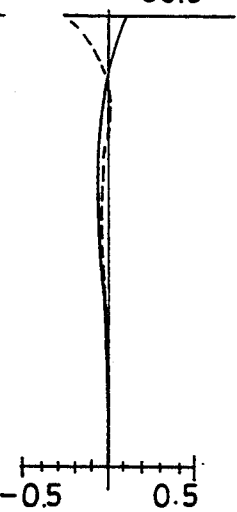
FIG. 9B represents Astigmatism.
Figure 9C:
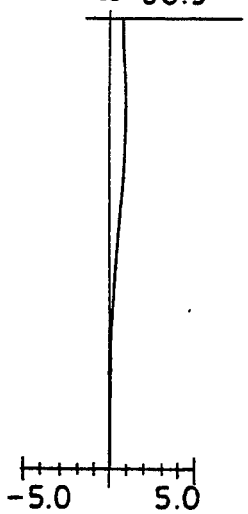
FIG. 9C represents Distortion.
Figure 9D:
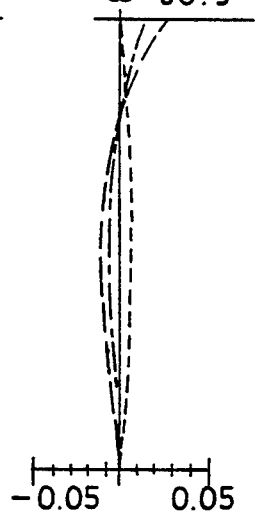
FIG. 9D represents Chromatic aberration of magnification at the wide setting.
Figure 9E:
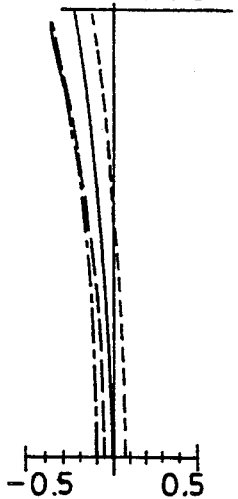
FIG. 9E represents Spherical aberration.
Figure 9F:
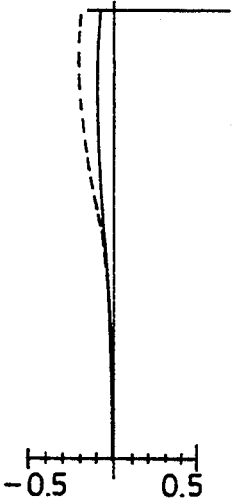
FIG. 9F represents Astigmatism.
Figure 9G:
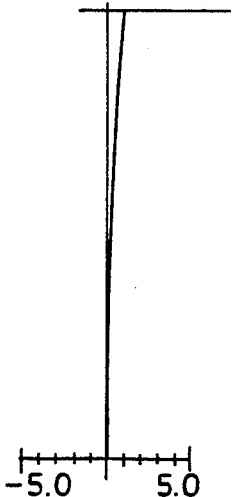
FIG. 9G represents Distortion.
Figure 9H:
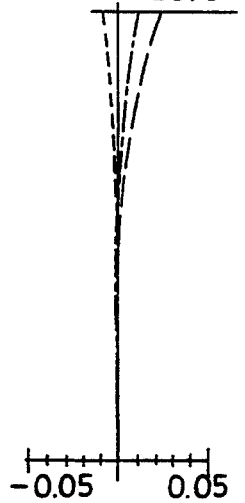
FIG. 9H represents Chromatic aberration of magnification at the standard setting.
Figure 9I:
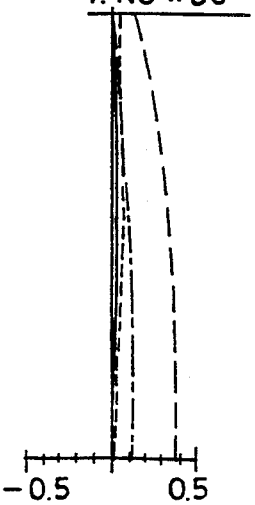
FIG. 9I represents Spherical aberration.
Figure 9J:
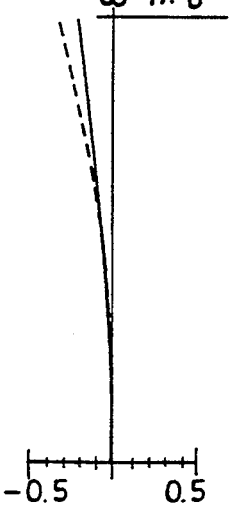
FIG. 9J represents Astigmatism.
Figure 9K:
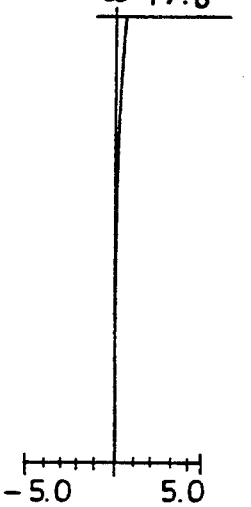
FIG. 9K represents Distortion.
Figure 9L:
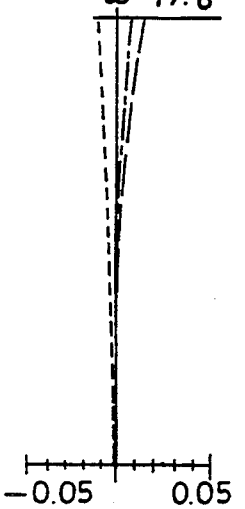
FIG. 9L represents Chromatic aberration of magnification at the telephoto setting.

In what follows, this invention will be explained with Reference to Examples 1–8, the numerical lens data of which will be enumerated later. The sections of the zoom lens systems according to Examples 1 and 2 at the wide angle (W) and telephoto (T) ends are illustrated in FIGS. 1A and 1B; the section of the zoom lens systems according to Examples 3, 5, 6 and 8 at the wide angle ends (W) in FIG. 2; the section of the zoom lens system according to Example 4 at the wide angle end (W) in FIG. 3; and the section of the zoom lens system according to Example 7 at the wide angle end (W) in FIG. 4.

In each of Examples 1-8, the first lens unit G1 comprises a cemented lens consisting of a negative meniscus lens convex on the object side and a positive meniscus lens convex on the object side.

In Example 1 or 2, the second lens unit G2 comprises, in order from the object side, a negative meniscus lens convex on the image side, a positive lens and a positive lens, three in all; in Example 3, 5, 6 or 8, it comprises, in order from the object side, a negative meniscus lens convex on the image side, a positive lens and a cemented lens consisting of a negative meniscus lens convex on the object side and a positive lens, four in all; and in Example 4 or 7, it comprises, in order from the object side, a negative meniscus lens convex on the image side, a positive meniscus lens convex on the image side and a cemented lens consisting of a negative meniscus lens convex on the object side and a positive lens, four in all.

In Example 1, 2, 3, 5, 6, 7 or 8, the third lens unit G3 comprises, in order from the object side, a positive meniscus lens convex on the image side and two negative meniscus lenses convex on the image side, three in all; and in Example 4, it comprises, in order from the object side, a positive meniscus lens convex on the image side, a double-concave lens and a negative meniscus lens convex on the image side.

In all the examples but Example 4, aspherical surfaces are placed on only the surfaces of the final lenses of the second lens unit G2. In Example 4, the aspherical surface is placed on only the surface of the second lens of the second lens unit G2 that is located on the image side.

Set out below are the numerical lens data of Examples 1-8, in which various symbols, with the exception of those already referred to, have the following meanings.

$f$—the focal length of the total system,
$F_{NO}$—the F-number
$2\omega$—the field angle
$f_B$—the back focus
$r_1, r_2$,—the radii of curvature of the respective lens surfaces
$d_1, d_2$,—the space between adjacent lens surfaces,
$n_{d1}, n_{d2}$,—the refractive indices of the respective lenses with respect to d-lines $\nu_{d1}, \nu_{d2}$,—the Abbe's numbers of the respective lenses If x and y denote the optical axis direction and the direction normal to the optical axis, respectively, then the configuration of an aspherical surface is given by $$x=(y^2/r)/[1+\{1-P(y^2/r^2)\}^{\frac{1}{2}}]+A_4y^4+A_6y^6+A_8y^8+A_{10}y^{10}.$$

Here r is the paraxial radius of curvature, P is the conical coefficient and $A_4$, $A_6$, $A_8$ and $A_{10}$ are the aspherical coefficients.

Example 1

$f = 36.2 \sim 49.5 \sim 67.55$
$F_{NO} = 4.64 \sim 6.0 \sim 7.86$
$2\omega = 61.7 \sim 47.2 \sim 35.5°$
$f_B = 7.0 \sim 17.118 \sim 30.713$

| | | | |
|---|---|---|---|
| $r_1 = 13.4535$ | $d_1 = 1.9349$ | $n_{d1} = 1.80518$ | $\nu_{d1} = 25.43$ |
| $r_2 = 10.4525$ | $d_2 = 2.7410$ | $n_{d2} = 1.48749$ | $\nu_{d2} = 70.20$ |
| $r_3 = 21.0871$ | $d_3 = $ (Variable) | | |
| $r_4 = \infty$ (Stop) | $d_4 = 2.3438$ | | |
| $r_5 = -8.7803$ | $d_5 = 1.0580$ | $n_{d3} = 1.51742$ | $\nu_{d3} = 52.41$ |
| $r_6 = -15.6134$ | $d_6 = 1.7311$ | | |
| $r_7 = 252.6154$ | $d_7 = 3.2268$ | $n_{d4} = 1.48749$ | $\nu_{d4} = 70.20$ |
| $r_8 = -12.5422$ | $d_8 = 0.2000$ | | |
| $r_9 = 84.0043$ | $d_9 = 1.9091$ | $n_{d5} = 1.56384$ | $\nu_{d5} = 60.69$ |
| $r_{10} = -50.4845$ (Aspheric) | $d_{10} = $ (Variable) | | |
| $r_{11} = -17.7233$ | $d_{11} = 2.2000$ | $n_{d6} = 1.63980$ | $\nu_{d6} = 34.48$ |
| $r_{12} = -15.4587$ | $d_{12} = 0.2000$ | | |
| $r_{13} = -30.3087$ | $d_{13} = 1.4124$ | $n_{d7} = 1.77250$ | $\nu d7 = 49.66$ |
| $r_{14} = -478.5832$ | $d_{14} = 3.5000$ | | |
| $r_{15} = -22.2136$ | $d_{15} = 1.7160$ | $n_{d8} = 1.72916$ | $\nu_{d8} = 54.68$ |
| $r_{16} = -102.7414$ | | | |

Zooming Spaces

| f | 36.2 | 49.5 | 67.55 |
|---|---|---|---|
| $d_3$ | 3.500 | 7.196 | 10.086 |
| $d_{10}$ | 10.086 | 6.390 | 3.500 |

Aspherical Coefficients

10th surface
$P = 1$
$A_4 = 0.42867 \times 10^{-4}$
$A_6 = -0.27145 \times 10^{-7}$
$A_8 = 0.42421 \times 10^{-8}$
$A_{10} = -0.57314 \times 10^{-10}$
$|f_3/f_w| = 0.598$
$\beta_{3w} = 1.502$
$f_1/f_w = 2.487$
$f_2/f_w = 0.667$
$E_w/f_w = 0.225$
$(n_{2P}) = 1.53$

Example 2

$f = 36.2 \sim 49.5 \sim 67.55$
$F_{NO} = 4.52 \sim 5.87 \sim 7.66$
$2\omega = 61.7 \sim 47.2 \sim -35.5°$
$f_B = 7.0 \sim 17.109 \sim 30.691$

| | | | |
|---|---|---|---|
| $r_1 = 13.6640$ | $d_1 = 2.5185$ | $n_{d1} = 1.80518$ | $\nu_{d1} = 25.43$ |
| $r_2 = 10.1341$ | $d_2 = 3.0742$ | $n_{d2} = 1.48749$ | $\nu_{d2} = 70.20$ |
| $r_3 = 21.3556$ | $d_3 = $ (Variable) | | |
| $r_4 = \infty$ (Stop) | $d_4 = 1.8000$ | | |
| $r_5 = -9.2733$ | $d_5 = 1.0463$ | $n_{d3} = 1.58904$ | $\nu_{d3} = 53.20$ |
| $r_6 = -17.9885$ | $d_6 = 1.7850$ | | |
| $r_7 = 351.4614$ | $d_7 = 3.1310$ | $n_{d4} = 1.48749$ | $\nu_{d4} = 70.20$ |
| $r_8 = -12.1155$ | $d_8 = 0.2000$ | | |
| $r_9 = 42.7990$ | $d_9 = 2.0333$ | $n_{d5} = 1.56384$ | $\nu_{d5} = 60.69$ |
| $r_{10} = -75.2257$ (Aspheric) | $d_{10} = $ (Variable) | | |
| $r_{11} = -17.8272$ | $d_{11} = 2.2000$ | $n_{d6} = 1.65016$ | $\nu_{d6} = 39.39$ |
| $r_{12} = -14.6790$ | $d_{12} = 0.2000$ | | |
| $r_{13} = -30.6024$ | $d_{13} = 1.4000$ | $n_{d7} = 1.75700$ | $\nu_{d7} = 47.87$ |
| $r_{14} = -317.2613$ | $d_{14} = 3.5000$ | | |
| $r_{15} = -18.7554$ | $d_{15} = 1.7000$ | $n_{d8} = 1.71300$ | $\nu_{d8} = 53.84$ |
| $r_{16} = -83.4094$ | | | |

Zooming Spaces

| f | 36.2 | 49.5 | 67.55 |
|---|---|---|---|
| $d_3$ | 3.500 | 7.289 | 10.251 |
| $d_{10}$ | 10.159 | 6.370 | 3.407 |

Aspherical Coefficients

10th surface
$P = 1$
$A_4 = 0.47746 \times 10^{-4}$
$A_6 = 0.42452 \times 10^{-7}$
$A_8 = 0.55561 \times 10^{-9}$
$A_{10} = -0.15989 \times 10^{-10}$
$|f_3/f_w| = 0.607$
$\beta_{3w} = 1.480$
$f_1/f_w = 2.599$
$f_2/f_w = 0.659$
$E_w/f_w = 0.253$
$(n_{2P}) = 1.53$

Example 3

$f = 36.2 \sim 49.5 \sim 67.55$
$F_{NO} = 4.65 \sim 6.0 \sim 7.9$
$2\omega = 61.7 \sim 47.2 \sim 35.5°$
$f_B = 7.0 \sim 16.546 \sim 29.388$

| | | | |
|---|---|---|---|
| $r_1 = 12.8910$ | $d_1 = 1.6338$ | $n_{d1} = 1.80518$ | $\nu_{d1} = 25.43$ |

-continued

| | | | |
|---|---|---|---|
| $r_2 = 9.9680$ | $d_2 = 3.3742$ | $n_{d2} = 1.48749$ | $\nu_{d2} = 70.20$ |
| $r_3 = 20.7379$ | $d_3 =$ (Variable) | | |
| $r_4 = \infty$ (Stop) | $d_4 = 1.8000$ | | |
| $r_5 = -10.9532$ | $d_5 = 1.0000$ | $n_{d3} = 1.58913$ | $\nu_{d3} = 60.97$ |
| $r_6 = -32.2733$ | $d_6 = 1.9483$ | | |
| $r_7 = 301.7936$ | $d_7 = 2.3000$ | $n_{d4} = 1.63980$ | $\nu_{d4} = 34.48$ |
| $r_8 = -18.2529$ | $d_8 = 0.5079$ | | |
| $r_9 = 31.8888$ | $d_9 = 1.0004$ | $n_{d5} = 1.80518$ | $\nu_{d5} = 25.43$ |
| $r_{10} = 15.0727$ | $d_{10} = 4.2059$ | $n_{d6} = 1.60729$ | $\nu_{d6} = 59.38$ |
| $r_{11} = -28.8720$ (Aspheric) | $d_{11} =$ (Variable) | | |
| $r_{12} = -15.9181$ | $d_{12} = 2.3260$ | $n_{d7} = 1.63980$ | $\nu_{d7} = 34.48$ |
| $r_{13} = -13.0578$ | $d_{13} = 0.2000$ | | |
| $r_{14} = -26.6001$ | $d_{14} = 1.4000$ | $n_{d8} = 1.77250$ | $\nu_{d8} = 49.66$ |
| $r_{15} = -284.8814$ | $d_{15} = 4.3000$ | | |
| $r_{16} = -14.7071$ | $d_{16} = 1.7000$ | $n_{d9} = 1.72916$ | $\nu_{d9} = 54.68$ |
| $r_{17} = -42.5091$ | | | |

Zooming Spaces

| f | 36.2 | 49.5 | 67.55 |
|---|---|---|---|
| $d_3$ | 3.500 | 6.683 | 9.164 |
| $d_{11}$ | 7.772 | 4.588 | 2.108 |

Aspherical Coefficients
11th surface
P = 1
$A_4 = 0.31972 \times 10^{-4}$
$A_6 = -0.25313 \times 10^{-7}$
$A_8 = 0.42076 \times 10^{-8}$
$A_{10} = -0.43544 \times 10^{-10}$
$|f_3/f_w| = 0.533$
$\beta_{3w} = 1.573$
$f_1/f_w = 2.314$
$f_2/f_w = 0.625$
$E_w/f_w = 0.237$
$(n_{2P}) = 1.62$ Example 4

$f = 36.2 \sim 49.5 \sim 67.55$
$F_{NO} = 4.47 \sim 5.85 \sim 7.7$
$2\omega = 61.7 \sim 47.2 \sim 35.5°$
$f_B = 7.0 \sim 17.075 \sim 30.653$

| | | | |
|---|---|---|---|
| $r_1 = 13.4718$ | $d_1 = 1.4979$ | $n_{d1} = 1.80518$ | $\nu_{d1} = 25.43$ |
| $r_2 = 10.6506$ | $d_2 = 2.7238$ | $n_{d2} = 1.48749$ | $\nu_{d2} = 70.20$ |
| $r_3 = 20.1520$ | $d_3 =$ (Variable) | | |
| $r_4 = \infty$ (Stop) | $d_4 = 1.8000$ | | |
| $r_5 = -10.8115$ | $d_5 = 1.0000$ | $n_{d3} = 1.58913$ | $\nu_{d3} = 60.97$ |
| $r_6 = -24.3782$ | $d_6 = 1.9453$ | | |
| $r_7 = -59.6460$ | $d_7 = 2.2517$ | $n_{d4} = 1.63980$ | $\nu_{d4} = 34.48$ |
| $r_8 = -18.0044$ (Aspheric) | $d_8 = 0.1000$ | | |
| $r_9 = 40.4117$ | $d_9 = 1.0004$ | $n_{d5} = 1.80518$ | $\nu_{d5} = 25.43$ |
| $r_{10} = 18.5561$ | $d_{10} = 3.8955$ | $n_{d6} = 1.60729$ | $\nu_{d6} = 59.38$ |
| $r_{11} = -21.3720$ | $d_{11} =$ (Variable) | | |
| $r_{12} = -16.2680$ | $d_{12} = 2.0194$ | $n_{d7} = 1.63980$ | $\nu_{d7} = 34.48$ |
| $r_{13} = -14.0288$ | $d_{13} = 0.2000$ | | |
| $r_{14} = -48.3696$ | $d_{14} = 1.4000$ | $n_{d8} = 1.77250$ | $\nu_{d8} = 49.66$ |
| $r_{15} = 296.6189$ | $d_{15} = 5.0000$ | | |
| $r_{16} = -14.3611$ | $d_{16} = 1.7000$ | $n_{d9} = 1.72916$ | $\nu_{d9} = 54.68$ |
| $r_{17} = -44.1027$ | | | |

Zooming Spaces

| f | 36.2 | 49.5 | 67.55 |
|---|---|---|---|
| $d_3$ | 3.500 | 7.059 | 9.811 |
| $d_{11}$ | 9.811 | 6.252 | 3.500 |

Aspherical Coefficients
8th surface
P = 1
$A_4 = 0.19134 \times 10^{-4}$
$A_6 = 0.30956 \times 10^{-6}$
$A_8 = 0.20235 \times 10^{-8}$
$A_{10} = 0.21753 \times 10^{-9}$
$|f_3/f_w| = 0.578$
$\beta_{3w} = 1.509$
$f_1/f_w = 2.813$
$f_2/f_w = 0.659$
$E_w/f_w = 0.210$
$(n_{2P}) = 1.62$ Example 5

$f = 36.2 \sim 49.5 \sim 67.55$

-continued $F_{NO} = 4.5 \sim 5.9 \sim 7.86$
$2\omega = 61.7 \sim 47.2 \sim 35.5°$
$f_B = 7.0 \sim 17.473 \sim 31.617$

| | | | |
|---|---|---|---|
| $r_1 = 13.6452$ | $d_1 = 1.4695$ | $n_{d1} = 1.80518$ | $\nu_{d1} = 25.43$ |
| $r_2 = 10.8335$ | $d_2 = 2.5091$ | $n_{d2} = 1.48749$ | $\nu_{d2} = 70.20$ |
| $r_3 = 18.9729$ | $d_3 =$ (Variable) | | |
| $r_4 = \infty$ (Stop) | $d_4 = 1.8000$ | | |
| $r_5 = -10.8293$ | $d_5 = 1.0000$ | $n_{d3} = 1.58913$ | $\nu_{d3} = 60.97$ |
| $r_6 = -28.1982$ | $d_6 = 1.9787$ | | |
| $r_7 = 157.6300$ | $d_7 = 2.3351$ | $n_{d4} = 1.63980$ | $\nu_{d4} = 34.48$ |
| $r_8 = -20.0441$ | $d_8 = 0.4943$ | | |
| $r_9 = 40.9546$ | $d_9 = 1.0004$ | $n_{d5} = 1.80518$ | $\nu_{d5} = 25.43$ |
| $r_{10} = 16.0579$ | $d_{10} = 3.9815$ | $n_{d6} = 1.60729$ | $\nu_{d6} = 59.38$ |
| $r_{11} = -25.7306$ (Aspheric) | $d_{11} =$ (Variable) | | |
| $r_{12} = -21.1326$ | $d_{12} = 2.4384$ | $n_{d7} = 1.63980$ | $\nu_{d7} = 34.48$ |
| $r_{13} = -15.3146$ | $d_{13} = 0.2000$ | | |
| $r_{14} = -30.6754$ | $d_{14} = 1.4000$ | $n_{d8} = 1.77250$ | $\nu_{d8} = 49.66$ |
| $r_{15} = -448.7953$ | $d_{15} = 4.6000$ | | |
| $r_{16} = -14.6285$ | $d_{16} = 1.7000$ | $n_{d9} = 1.72916$ | $\nu_{d9} = 54.68$ |
| $r_{17} = -43.8083$ | | | |

Zooming Spaces

| f | 36.2 | 49.5 | 67.55 |
|---|---|---|---|
| $d_3$ | 3.500 | 7.176 | 9.991 |
| $d_{11}$ | 9.991 | 6.315 | 3.500 |

Aspherical Coefficients
11th surface
P = 1
$A_4 = 0.28521 \times 10^{-4}$
$A_6 = -0.11137 \times 10^{-6}$
$A_8 = 0.46633 \times 10^{-8}$
$A_{10} = -0.55713 \times 10^{-10}$
$|f_3/f_w| = 0.593$
$\beta_{3w} = 1.495$
$f_1/f_w = 3.462$
$f_2/f_w = 0.658$
$E_w/f_w = 0.201$
$(n_{2P}) = 1.62$ Example 6

$f = 36.2 \sim 49.5 \sim 67.55$
$F_{NO} = 4.38 \sim 5.77 \sim 7.66$
$2\omega = 61.7 \sim 47.2 \sim 35.5°$
$f_B = 7.0 \sim 19.383 \sim 36.11$

| | | | |
|---|---|---|---|
| $r_1 = 14.8059$ | $d_1 = 1.4347$ | $n_{d1} = 1.80518$ | $\nu_{d1} = 25.43$ |
| $r_2 = 12.0223$ | $d_2 = 2.1074$ | $n_{d2} = 1.48749$ | $\nu_{d2} = 70.20$ |
| $r_3 = 19.2144$ | $d_3 =$ (Variable) | | |
| $r_4 = \infty$ (Stop) | $d_4 = 1.8000$ | | |
| $r_5 = -11.0194$ | $d_5 = 1.0000$ | $n_{d3} = 1.58913$ | $\nu_{d3} = 60.97$ |
| $r_6 = -31.5905$ | $d_6 = 1.9743$ | | |
| $r_7 = 243.9211$ | $d_7 = 2.3140$ | $n_{d4} = 1.63980$ | $\nu_{d4} = 34.48$ |
| $r_8 = -19.4003$ | $d_8 = 0.4429$ | | |
| $r_9 = 41.3266$ | $d_9 = 1.0004$ | $n_{d5} = 1.80518$ | $\nu_{d5} = 25.43$ |
| $r_{10} = 15.7095$ | $d_{10} = 3.9784$ | $n_{d6} = 1.60729$ | $\nu_{d6} = 59.38$ |
| $r_{11} = -27.1220$ (Aspheric) | $d_{11} =$ (Variable) | | |
| $r_{12} = -18.1028$ | $d_{12} = 2.2001$ | $n_{d7} = 1.63980$ | $\nu_{d7} = 34.48$ |
| $r_{13} = -15.0688$ | $d_{13} = 0.2000$ | | |
| $r_{14} = -50.2245$ | $d_{14} = 1.4000$ | $n_{d8} = 1.77250$ | $\nu_{d8} = 49.66$ |
| $r_{15} = -500.0000$ | $d_{15} = 5.0002$ | | |
| $r_{16} = -15.3428$ | $d_{16} = 1.7000$ | $n_{d9} = 1.72916$ | $\nu_{d9} = 54.68$ |
| $r_{17} = -41.7113$ | | | |

Zooming Spaces

| f | 36.2 | 49.5 | 67.55 |
|---|---|---|---|
| $d_3$ | 3.500 | 8.445 | 12.226 |
| $d_{11}$ | 12.226 | 7.281 | 3.500 |

Aspherical Coefficients
11th surface
P = 1
$A_4 = 0.21893 \times 10^{-4}$
$A_6 = -0.14637 \times 10^{-6}$
$A_8 = 0.39041 \times 10^{-8}$
$A_{10} = -0.41057 \times 10^{-10}$
$|f_3/f_w| = 0.752$
$\beta_{3w} = 1.39$
$f_1/f_w = 4.705$
$f_2/f_w = 0.709$
$E_w/f_w = 0.186$ -continued $(n_{2P}) = 1.62$

Example 7

$f = 36.2 \sim 49.5 \sim 67.55$
$F_{NO} = 4.50 \sim 5.85 \sim 7.66$
$2\omega = 61.7 \sim 47.2 \sim 35.5°$
$f_B = 7.39 \sim 16.48 \sim 28.704$

| | | | |
|---|---|---|---|
| $r_1 = 13.1779$ | $d_1 = 1.8330$ | $n_{d1} = 1.80518$ | $\nu_{d1} = 25.43$ |
| $r_2 = 9.9386$ | $d_2 = 3.9356$ | $n_{d2} = 1.48749$ | $\nu_{d2} = 70.20$ |
| $r_3 = 22.3543$ | $d_3 = $ (Variable) | | |
| $r_4 = \infty$ (Stop) | $d_4 = 2.3446$ | | |
| $r_5 = -11.2947$ | $d_5 = 1.0000$ | $n_{d3} = 1.58913$ | $\nu_{d3} = 60.97$ |
| $r_6 = -30.8349$ | $d_6 = 1.6015$ | | |
| $r_7 = -619.4777$ | $d_7 = 1.7692$ | $n_{d4} = 1.63980$ | $\nu_{d4} = 34.48$ |
| $r_8 = -19.2825$ | $d_8 = 0.9317$ | | |
| $r_9 = 35.1756$ | $d_9 = 1.0000$ | $n_{d5} = 1.80518$ | $\nu_{d5} = 25.43$ |
| $r_{10} = 17.2468$ | $d_{10} = 3.5688$ | $n_{d6} = 1.60729$ | $\nu_{d6} = 59.38$ |
| $r_{11} = -23.2843$ (Aspheric) | $d_{11} = $ (Variable) | | |
| $r_{12} = -18.5834$ | $d_{12} = 2.5752$ | $n_{d7} = 1.63980$ | $\nu_{d7} = 34.48$ |
| $r_{13} = -13.5522$ | $d_{13} = 0.2000$ | | |
| $r_{14} = -22.5824$ | $d_{14} = 1.0000$ | $n_{d8} = 1.77250$ | $\nu_{d8} = 49.66$ |
| $r_{15} = -175.7960$ | $d_{15} = 4.0000$ | | |
| $r_{16} = -14.8727$ | $d_{16} = 1.0000$ | $n_{d9} = 1.72916$ | $\nu_{d9} = 54.68$ |
| $r_{17} = -49.7270$ | | | |

Zooming Spaces

| f | 36.2 | 49.5 | 67.55 |
|---|---|---|---|
| $d_3$ | 3.162 | 6.246 | 8.653 |
| $d_{11}$ | 7.515 | 4.431 | 2.024 |

Aspherical Coefficients

11th surface
$P = 1$
$A_4 = 0.41618 \times 10^{-4}$
$A_6 = 0.66939 \times 10^{-8}$
$A_8 = 0.23548 \times 10^{-8}$
$A_{10} = -0.93448 \times 10^{-11}$
$|f_3/f_W| = 0.511$
$\beta_{3W} = 1.567$
$f_1/f_W = 2.217$
$f_2/f_W = 0.623$
$E_W/f_W = 0.246$
$(n_{2P}) = 1.62$

Example 8

$f = 36.2 \sim 49.5 \sim 67.55$
$F_{NO} = 4.49 \sim 5.92 \sim 7.86$
$2\omega = 61.7 \sim 47.2 \sim 35.5°$
$f_B = 7.0 \sim 17.712 \sim 32.187$

| | | | |
|---|---|---|---|
| $r_1 = 13.7959$ | $d_1 = 1.4666$ | $n_{d1} = 1.80518$ | $\nu_{d1} = 25.43$ |
| $r_2 = 10.9889$ | $d_2 = 2.5186$ | $n_{d2} = 1.48749$ | $\nu_{d2} = 70.20$ |
| $r_3 = 18.6430$ | $d_3 = $ (Variable) | | |
| $r_4 = \infty$ (Stop) | $d_4 = 1.8000$ | | |
| $r_5 = -10.7884$ | $d_5 = 1.0000$ | $n_{d3} = 1.58913$ | $\nu_{d3} = 60.97$ |
| $r_6 = -27.9676$ | $d_6 = 1.9813$ | | |
| $r_7 = 139.3309$ | $d_7 = 2.3392$ | $n_{d4} = 1.63980$ | $\nu_{d4} = 34.48$ |
| $r_8 = -20.0662$ | $d_8 = 0.5012$ | | |
| $r_9 = 41.5458$ | $d_9 = 1.0004$ | $n_{d5} = 1.80518$ | $vd5 = 25.43$ |
| $r_{10} = 15.7488$ | $d_{10} = 3.9982$ | $n_{d6} = 1.60729$ | $\nu_{d6} = 59.38$ |
| $r_{11} = -25.8684$ (Aspheric) | $d_{11} = $ (Variable) | | |
| $r_{12} = -22.3919$ | $d_{12} = 2.6169$ | $n_{d7} = 1.63980$ | $\nu_{d7} = 34.48$ |
| $r_{13} = -15.3974$ | $d_{13} = 0.2000$ | | |
| $r_{14} = -30.5013$ | $d_{14} = 1.4000$ | $n_{d8} = 1.77250$ | $\nu_{d8} = 49.66$ |
| $r_{15} = -448.7953$ | $d_{15} = 4.6000$ | | |
| $r_{16} = -14.4370$ | $d_{16} = 1.7000$ | $n_{d9} = 1.72916$ | $\nu_{d9} = 54.68$ |
| $r_{17} = -42.7598$ | | | |

Zooming Spaces

| f | 36.2 | 49.5 | 67.55 |
|---|---|---|---|
| $d_3$ | 3.500 | 7.318 | 10.234 |
| $d_{11}$ | 10.234 | 6.416 | 3.500 |

Aspherical Coefficients

11th surface
$P = 1$
$A_4 = 0.28523 \times 10^{-4}$
$A_6 = -0.10242 \times 10^{-6}$
$A_8 = 0.43313 \times 10^{-8}$
$A_{10} = -0.53557 \times 10^{-10}$
$|f_3/f_W| = 0.610$
$\beta_{3W} = 1.478$
$f_1/f_W = 3.794$
$f_2/f_W = 0.661$
$E_W/f_W = 0.201$
$(n_{2P}) = 1.62$ The aberration curve diagrams of Examples 1–8 at the wide angle (W), standard (S) and telephoto (T) ends are shown in FIGS. 5–12, respectively.

As described above, this invention can provide a three-unit compact zoom lens system having a zoom ratio of about 2, which is as short as 1.3 or less in the telephoto ratio at the wide angle end, and reduced in the lens diameter and length of the first lens unit. This zoom lens system is suitable for a lens shutter type of cameras, etc.

What is claimed is:

1. A zoom lens system comprising, in order from the object side:
    a first lens unit having a positive refractive power,
    a second lens unit having a positive refractive power, and
    a third lens unit having a negative refractive power,
    wherein during zooming from the wide angle end to the telephoto end, said first and third lens units are movable toward the object side and said second lens unit is movable toward the object side at a speed relatively lower than that at which said first and third lens units are moved, and said zoom lens system satisfying the following conditions:

$$0.5 < |f_3/f_W| < 0.9, \qquad (1)$$

$$1.3 < \beta_{3W} < 2.0, \qquad (2)$$

$$1.7 < f_1/f_W < 5.0, \qquad (3)$$

$$0.5 < f_2/f_W < 1.3, \qquad (4)$$

and $$0.1 < E_W/f_W < 0.35, \qquad (5)$$

wherein:
    $f_W$ is the focal length of the total system at the wide angle end,
    $f_1$, $f_2$ and $f_3$ are the focal lengths of the first, second and third lens units, respectively,
    $\beta_{3W}$ is the image-formation magnification of the third lens unit, and
    $E_W$ is the distance from the first surface (proximate to the object side) to the entrance pupil of the lens system at the wide angle end.

2. A zoom lens system as claimed in claim 1, wherein the first lens unit consists of a negative meniscus lens convex on the object side and a positive meniscus lens convex on the object side, the second lens unit includes one negative lens and two positive lenses, and the third lens unit includes two negative lenses.

3. A zoom lens system as claimed in claim 2, wherein the second lens unit includes an aspherical surface.

4. A zoom lens system as claimed in claim 2, which further satisfies the following condition:

$$(n_{2P}) < 1.65, \qquad (6)$$

wherein ($n_{2p}$) is the mean value of the refractive indices of the positive lenses in the second lens unit.

5. A zoom lens system comprising, in order from the object side:

a first lens unit having a positive refractive power.

a second lens unit having a positive refractive and a third lens unit having a negative refractive wherein during zooming from the wide angle end to the telephoto end, said first and third lens units are movable toward the object side and said second lens unit is movable toward the object side at a speed relatively lower than that at which said first and third lens units are moved, wherein an aperture stop is disposed on the entrance side of the second lens unit and is movable therewith, and said zoom lens system satisfying the following conditions:

$$0.5 < |f_3/f_W| < 0.9, \quad (1)$$

$$1.3 < \beta_{3W} < 2.0, \quad (2)$$

$$1.7 < f_1/f_W < 5.0, \quad (3)$$

and $$0.5 < f_2/f_W < 1.3, \quad (4)$$

wherein:

$f_W$ is the focal length of the total system at the wide angle end, $f_1$, $f_2$ and $f_3$ are the focal lengths of the first, second and third lens units, respectively, and $\beta_{3W}$ is the image-formation magnification of the third lens unit.

6. A zoom lens system as claimed in claim 1 or 5, wherein the first and third lens units are movable with the space therebetween remaining invariable.

7. A zoom lens system comprising, in order from the object side:

a first lens unit including a cemented lens consisting of a negative meniscus lens convex on the object side and a positive meniscus lens convex on the object side, said first lens unit having a positive refractive power;

a second lens unit including a negative lens and a positive lens, said second lens unit having a positive refractive power; and a third lens unit including a positive lens concave on the object side and a negative lens concave on the object side, said third lens unit having a negative refractive power;

wherein said first, second and third lens units are all movable toward the object side with an increase in a space between said first and second lens units and a decrease in a space between said second and third lens units, thereby increasing the focal length of the entire system;

wherein an aperture stop is disposed between said first and second lens units and is movable together with said second lens unit; and wherein said positive lens of said second lens unit is a single lens.

8. A zoom lens system comprising, in order from the object side:

a first lens unit including a negative meniscus lens convex on the object side and a positive meniscus lens convex on the object side, said first lens unit having a positive refractive power;

a second lens unit including a negative lens and a positive lens, said second lens unit having a positive refractive power; and a third lens unit including a positive lens concave on the object side and a negative lens concave on the object side, said third lens unit having a negative refractive power;

wherein said first, second and third lens units are all movable toward the object side with an increase in a space between said first and second lens units and a decrease in a space between said second and third lens units, thereby increasing the focal length of the entire system;

wherein an aperture stop is disposed between said first and second lens units and is movable together with said second lens unit; and wherein the positive lens of the second lens unit on the image side is a cemented doublet.

9. A zoom lens system as claimed in claim 7 or 8, wherein the positive lens of the second lens unit proximate to the image side includes an aspherical surface.

10. A zoom lens system as claimed in claim 8, wherein the positive lens of the second lens unit proximate to the object side includes an aspherical surface.

11. A zoom lens system as claimed in claim 7 or 8, wherein the telephoto ratio at the wide angle end is 1.3 or lower.

* * * * *